(12) United States Patent
Sinha et al.

(10) Patent No.: US 8,900,767 B2
(45) Date of Patent: Dec. 2, 2014

(54) ALGORITHM FOR IN-SITU QUANTIFICATION OF PEMFC MEMBRANE HEALTH OVER ITS LIFE

(75) Inventors: Puneet K. Sinha, Rochester, NY (US); Andrew J. Maslyn, Rochester, NY (US); Balasubramanian Lakshmanan, Pittsford, NY (US)

(73) Assignee: GM Global Technology Operations LLC, Detroit, MI (US)

(*) Notice: Subject to any disclaimer, the term of this patent is extended or adjusted under 35 U.S.C. 154(b) by 890 days.

(21) Appl. No.: 13/094,263

(22) Filed: Apr. 26, 2011

(65) Prior Publication Data
US 2012/0274332 A1    Nov. 1, 2012

(51) Int. Cl.
*H01M 8/04* (2006.01)
(52) U.S. Cl.
CPC ...... *H01M 8/04992* (2013.01); *H01M 8/04223* (2013.01); *H01M 8/04261* (2013.01); *H01M 8/04447* (2013.01); *H01M 8/04455* (2013.01); *H01M 8/04559* (2013.01); *H01M 8/04589* (2013.01); *H01M 8/04679* (2013.01); *H01M 8/04753* (2013.01); *Y02E 60/50* (2013.01)
USPC ............................ 429/430; 429/428; 429/432

(58) Field of Classification Search
CPC ..................... H01M 8/04223; H01M 8/04992
USPC ......................................... 429/428, 430, 432
See application file for complete search history.

(56) References Cited

U.S. PATENT DOCUMENTS

| 8,450,020 B2 * | 5/2013 | Sinha et al. ................ 429/430 |
| 2006/0251944 A1 * | 11/2006 | Hatoh et al. ................ 429/32 |
| 2008/0145720 A1 * | 6/2008 | Sinha et al. ................ 429/13 |

* cited by examiner

*Primary Examiner* — Zachary Best
(74) *Attorney, Agent, or Firm* — John A. Miller; Miller IP Group, PLC

(57) ABSTRACT

A method for determining the health of the membranes in a fuel cell stack. The total parasitic current of the fuel cells in the stack is determined. From the total parasitic current, the shorting resistance and the cross-over parasitic current are determined. The health of the membranes is then determined from the cross-over parasitic current and the shorting resistance.

20 Claims, 2 Drawing Sheets

ALGORITHM FOR IN-SITU QUANTIFICATION OF PEMFC MEMBRANE HEALTH OVER ITS LIFE

BACKGROUND OF THE INVENTION

1. Field of the Invention

This invention relates generally to a method for quantifying the health of fuel cell membranes over the life of the membranes and, more particularly, to a method for determining a cross-over parasitic current and a shorting resistance of the membranes to determine the health of the fuel cells.

2. Discussion of the Related Art

Hydrogen is a very attractive fuel because it is renewable and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs require adequate fuel supply and humidification for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack typically includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable and thus allow nitrogen in the air from the cathode side of the stack to permeate therethrough and collect in the anode side of the stack, often referred to as nitrogen cross-over. Even though the anode side pressure may be slightly higher than the cathode side pressure, cathode side partial pressures will cause oxygen and nitrogen to permeate through the membrane. The permeated oxygen combusts in the presence of the anode catalyst, but the permeated nitrogen in the anode side of the fuel cell stack dilutes the hydrogen. If the nitrogen concentration increases above a certain percentage, such as 50%, fuel cells in the stack may become starved of hydrogen. If the anode becomes hydrogen starved, the fuel cell stack may fail to produce adequate electrical power and may suffer damage to the electrodes in the fuel cell stack.

It is known in the art to provide a bleed valve at the anode exhaust gas output of the fuel cell stack to remove nitrogen from the anode side of the stack. It is also known in the art to estimate the molar fraction of nitrogen in the anode side using a model to determine when to perform the bleed of the anode side or anode sub-system. However, the model estimation may contain errors, particularly as degradation of the components of the fuel cell system occurs over time. If the anode nitrogen molar fraction estimation is significantly higher than the actual nitrogen molar fraction, the fuel cell system will vent more anode gas than is necessary, i.e., waste fuel. If the anode nitrogen molar fraction estimation is significantly lower than the actual nitrogen molar fraction, the system will not vent enough anode gas and may starve the fuel cells of reactants, which may damage the electrodes in the fuel cell stack.

There is a need in the art to determine the health of the membranes in a fuel cell stack throughout the lifetime of the stack to identify stack failure due to singular events or uniform membrane degradation. In addition, understanding membrane health will aid in the development of more durable membranes for fuel cells.

SUMMARY OF THE INVENTION

In accordance with the teachings of the present invention, a method is disclosed for determining the health of the membranes in a fuel cell stack. The total parasitic current of the fuel cells in the stack is determined. From the total parasitic current, the shorting resistance and the cross-over parasitic current are determined. The health of the membranes is then determined from the cross-over parasitic current and the shorting resistance.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for quantifying the health of a fuel cell membrane over the life of the membrane is merely exemplary in nature, and is in no way intended to limit the invention or its applications or uses.

Figure 1:
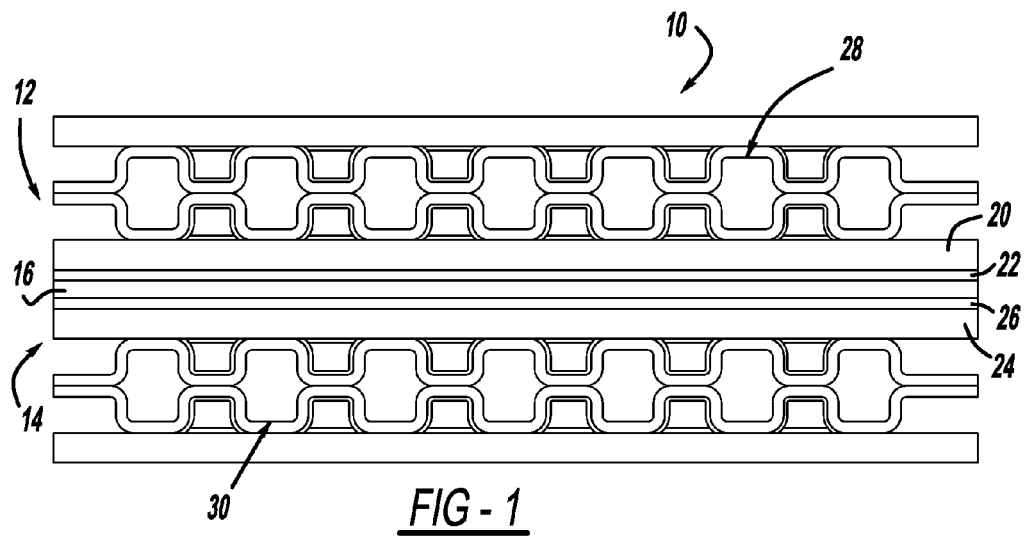
FIG. 1 is a cross-sectional view of a fuel cell.

FIG. 1 is a cross-sectional view of a fuel cell 10 that is part of a fuel cell stack of the type discussed below. The fuel cell 10 includes a cathode side 12 and an anode side 14 separated by a perfluorosulfonic acid membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. A cathode side flow field plate 28 is provided on the cathode side 12, and an anode side flow field plate or bipolar plate 30 is provided on the anode side 14.

Figure 2:
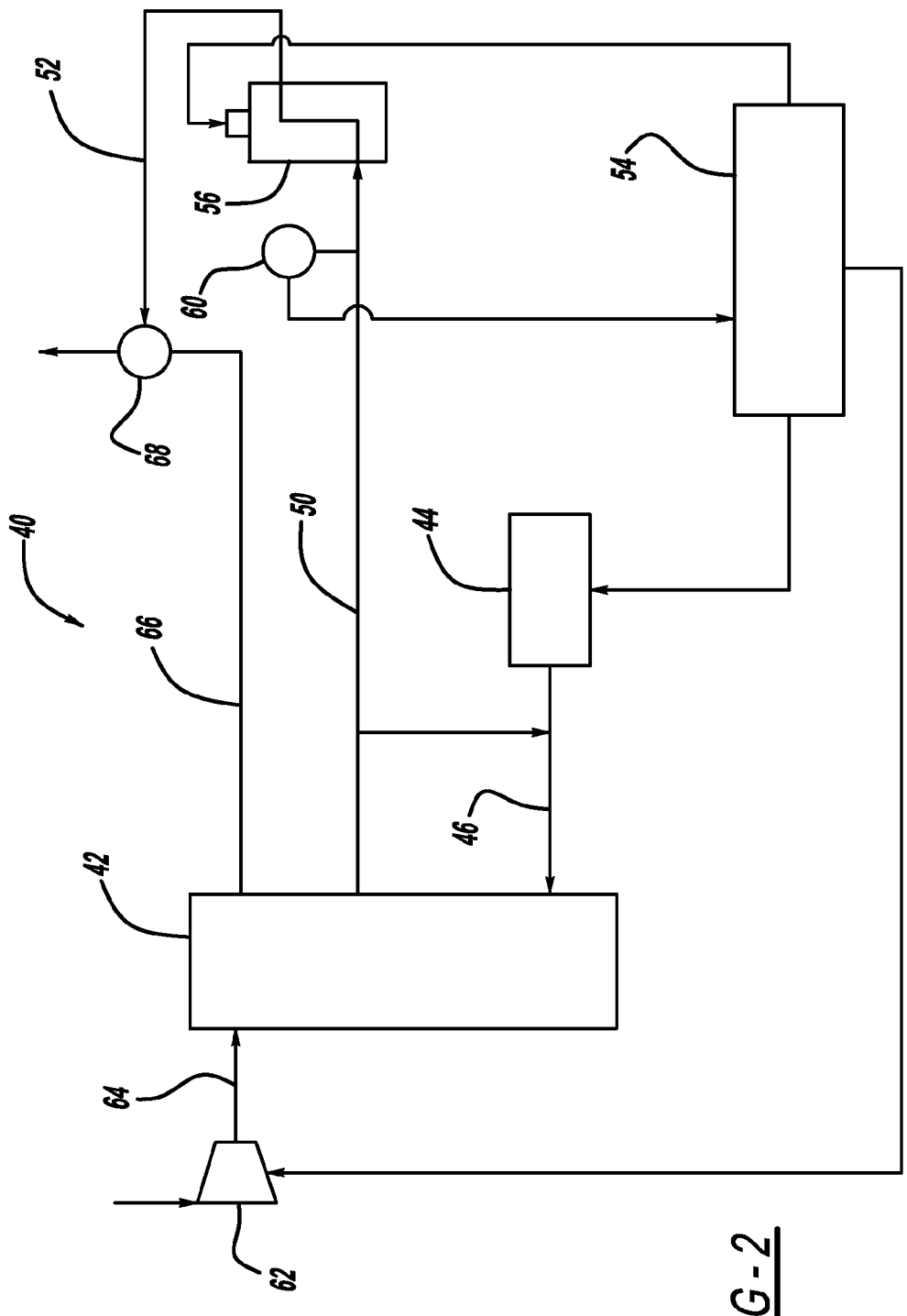
FIG. 2 is a simplified block diagram of a fuel cell system.

FIG. 2 is a simplified block diagram of a fuel cell system 40 including a fuel cell stack 42. Hydrogen gas from a hydrogen source 44 is provided to the anode side of the fuel cell stack 42 on line 46. An anode exhaust gas is output from the fuel cell stack 42 on line 50 and is recirculated to the line 46. A bleed valve 56 is periodically opened to bleed the anode exhaust gas through a bleed line 52 to remove nitrogen from the anode sub-system. A pressure sensor 60 is also provided in the line 50 to measure the pressure of the anode sub-system of the fuel cell system 40. In an alternate embodiment, the pressure sensor 60 may be positioned in the line 46, as is known to those having skill in the art. FIG. 2 illustrates one example of a fuel cell system that may be used with the present invention. Other examples include fuel cell systems that employ a split stack design with anode flow-shifting.

Air from a compressor 62 is provided to the cathode side of the fuel cell stack 42 on line 64. A cathode gas is output from the fuel cell stack 42 on a cathode gas line 66. A mixing device 68 is provided in the line 66 for mixing the cathode gas and the bled anode exhaust gas on the line 52.

A controller 54 monitors the pressure of the anode sub-system of the fuel cell system 40, as measured by the pressure sensor 60, controls the speed of the compressor 62, controls the injection of hydrogen from the hydrogen source 44 to the anode side of the stack 42, and controls the position of the anode bleed valve 56, as is discussed in more detail below. The controller 54 employs a model to estimate the permeation of nitrogen from the cathode side to the anode side through the stack membranes 16 and the concentration of nitrogen in the anode side of the stack 42. In addition, the controller 54 measures the length of time required for the anode sub-system to reach atmospheric pressure after the fuel cell system 40 has been shutdown. The controller 54 also employs an algorithm that quantifies the parasitic current for membranes in the stack 42 to determine the health of the membranes 16 in the stack 42, and also determines whether the parasitic current is due to gases crossing the membrane or is due to shorting currents through the membrane, as is discussed in more detail below.

Parasitic current directly correlates to membrane health. To determine changes in the rate of permeation of the membrane 16, the pressure profile of the anode after shutdown of the fuel cell system 40 can be used. During a normal shutdown, the cathode is depleted of oxygen, causing high levels of nitrogen and low levels of hydrogen at atmospheric pressure. The cathode is at atmospheric pressure because the cathode side of the stack 42 is not sealed. The anode side of the stack 42, however, is sealed and remains sealed at system shutdown. Thus, the anode side of the fuel cell stack 42 has a pressurized mixture of a known amount of hydrogen and nitrogen. When the fuel cell system 40 enters the off state, or cathode air flow is shutdown, hydrogen in the anode side of the stack 42 will rapidly diffuse through the membrane 16 into the cathode side of the stack 42 until the hydrogen has equilibrated across the membrane 16. This will cause a decrease in pressure in the anode side of the fuel cell stack 42. Thus, cross-over parasitic current will be dependent on pressure, meaning the total parasitic current is determined as a function of pressure.

When parasitic current is low, membranes are healthy and are functioning as expected. Thus, the health of the membranes may be determined throughout the life of the fuel cell stack 42. Furthermore, the parasitic current for each membrane 16 in the stack 42 may be determined by measuring the cell voltage of each cell, or may be determined by monitoring average cell voltage and minimum cell voltage. In addition, the variation in parasitic current of the membranes 16 may be used to determine whether rapid degradation of a membrane 16 in the stack 42 is occurring, or whether the membranes 16 are degrading more uniformly.

If it is determined, based on stack characteristics, that the parasitic current of one or more of the membranes 16 is large enough to indicate a singular event, such as a shorting event, the fuel cell stack 42 may need to be shutdown and repaired. The controller 56 may indicate that servicing of the stack 42 is needed, for example, servicing of the stack 42 may be necessary if a predetermined threshold value of a shorting resistance is achieved. The predetermined threshold value will depend on stack characteristics, such as the number of fuel cells in the stack. If, however, the parasitic current of one or more of the membranes 16 does not indicate a shorting event, i.e., the membranes 16 are degrading uniformly, the algorithm may adapt the operation of the fuel cell system 10 to compensate for the degradation of the membranes 16. For example, if it is determined that hydrogen is crossing over, i.e., cross-over parasitic current is increasing in the membranes 16, nitrogen may be building up in the anode side of the stack 42. Under such circumstances, the algorithm may cause the controller 56 to adapt the bleed schedule of the anode side of the stack 42 to remove the build-up of nitrogen in the anode side, i.e., the algorithm may cause the controller 56 to adapt the bleed schedule of the anode side of the stack 42 if a predetermined threshold of cross-over parasitic current is achieved.

A test protocol is used to quantify the health of the membranes in the stack 42. The test protocol includes multiple hydrogen takeover tests where the concentration of hydrogen in the anode side of the stack 42 is stepped down over time, the flow rate of hydrogen to the anode side of the stack 42 is maintained at a constant flow rate, and the flow rate of cathode air to the cathode side of the stack 42 is stopped at each step down in hydrogen concentration. By measuring cell voltage and coulombic charge of the cells in the stack 42 as the voltage drops after cathode air flow is stopped for each instance there is a step down in the concentration of hydrogen in the anode side of the stack 42 during the test protocol, the parasitic current of the membranes 16 may be determined by plotting hydrogen concentration versus the total parasitic current, as discussed below. The cell voltage for each cell may be measured, or average cell voltage for the stack 42 may be determined during the test protocol. Minimum cell voltage may also be measured, particularly when average cell voltage is being measured.

Figure 3:
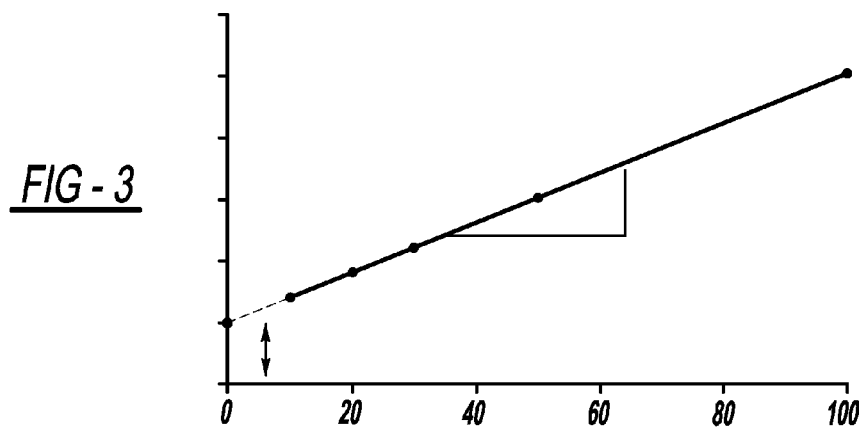
FIG. 3 is a graph with percent hydrogen in the anode on the x-axis and total parasitic current in $mA/cm^2$ on the y-axis.

The parasitic current, as determined by analyzing the drop in cell voltage and coulombic charge of the cells after the flow of cathode air is stopped for each step down in concentration of hydrogen in the anode side of the stack 42, is plotted on a graph. FIG. 3 is an example graph of such a plot, with percent of hydrogen in the anode side on the x-axis and total parasitic current in mA/cm$^2$ on the y-axis. The amount of parasitic current that is caused by cross-over parasitic current and the amount of parasitic current that is caused by shorting parasitic current, or shorting resistance, is determined according to the test protocol described above. Shorting resistance is determined from the current density, as is known to those skilled in the art. The slope of the line plotted on the graph represents the cross-over parasitic current per percent hydrogen, i.e., the parasitic current caused by anode and cathode gases crossing the membrane. The intercept of the line represents shorting resistance, i.e., a singular shorting event. Thus, from the total parasitic current, the amount that is cross-over parasitic current and the amount that is shorting resistance may be determined.

Figure 4:
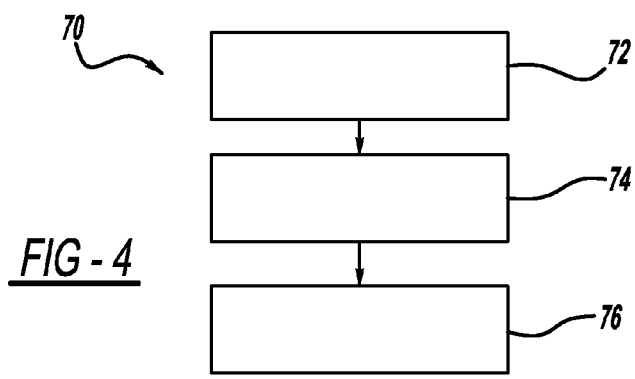
FIG. 4 is a flow chart diagram of an algorithm for quantifying membrane health.

FIG. 4 is a flow diagram 70 of an algorithm for quantifying membrane health. At box 72, multiple hydrogen takeover tests are performed at various anode hydrogen concentrations according to the test protocol discussed above. For each of the hydrogen concentrations, the algorithm analyzes a predetermined drop in voltage after the flow of cathode air has been stopped at box 74. For example, the algorithm analyzes a drop of 100 mV after the flow of cathode air has been stopped, and calculates the parasitic current of the fuel cell stack 42 based on the correlation between voltage drop, time and pressure. At box 76, the algorithm creates a plot of parasitic current versus the percent of hydrogen in the anode side of the fuel cell stack 42. The slope of the line represents the cross-over parasitic current, and the intercept of the line represents the shorting resistance. Thus, the cross-over parasitic current and the shorting resistance for the membranes in the stack 42 may be determined from the total parasitic current as calculated from the test protocol described above. Multiple analyses using the test protocol described above allows for the membranes 16 to be monitored over time, which will provide information as to how membranes degrade over time, and may aid in the development of more durable membranes for fuel cells.

The algorithm as described above may be implemented in a fuel cell system 10 in a vehicle or while in for servicing. When the fuel cell system 10 is in a vehicle, the algorithm may be implemented at any time power is not being drawn from the fuel cell stack 12. Power may be supplied from sources other than the fuel cell stack 12 during the quantification of membrane health using the algorithm as described above.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining the health of membranes in a fuel cell stack, said method comprising:
    preventing power from being drawn from the fuel cell stack;
    determining a total parasitic current of fuel cells in the fuel cell stack as a function of pressure;
    determining a shorting resistance and a cross-over parasitic current from the total parasitic current; and
    determining the health of the membranes in the stack based on the shorting resistance and the cross-over parasitic current.

2. The method according to claim 1 wherein determining the total parasitic current of fuel cells in the stack includes stepping down the concentration of hydrogen in an anode side of the stack and stopping a cathode air flow to a cathode side of the stack each time the hydrogen concentration is stepped down.

3. The method according to claim 2 wherein determining the total parasitic current of the fuel cells in the fuel cell stack includes measuring cell voltage and coulombic charge of the fuel cells in the stack as fuel cell voltage drops each time after the cathode flow of air is stopped.

4. The method according to claim 1 wherein determining the shorting resistance and the cross-over parasitic current from the total parasitic current includes plotting hydrogen concentration in an anode side of the stack on an x-axis of a graph and plotting the total parasitic current on a y-axis of the graph.

5. The method according to claim 4 wherein plotting the hydrogen concentration in the anode side on the x-axis and the total parasitic current on the y-axis includes forming a line, where a slope of the line represents the cross-over parasitic current and an intercept of the line represents the shorting resistance.

6. The method according to claim 1 further comprising adapting a bleed schedule of the fuel cell stack when a predetermined threshold of the cross-over parasitic current has been achieved.

7. The method according to claim 1 further comprising indicating that fuel cell stack repair is necessary if a predetermined threshold of the shorting resistance has been achieved.

8. A method for determining the health of membranes in a fuel cell stack, said method comprising:
    performing a test protocol that includes stepping down the concentration of hydrogen in an anode side of the stack and stopping a cathode air flow to a cathode side of the stack each time the hydrogen concentration is stepped down;
    measuring a voltage drop of fuel cells in the stack during the test protocol;
    determining a total parasitic current of the fuel cells in the stack based on the measured voltage drop during the test protocol; and
    determining a shorting resistance and a cross-over parasitic current from the total parasitic current.

9. The method according to claim 8 wherein performing the test protocol at shutdown of the fuel cell stack includes stepping down a concentration of hydrogen in an anode side of the stack, and stopping a cathode air flow on a cathode side of the stack each time the hydrogen concentration is stepped down.

10. The method according to claim 8 wherein determining the total parasitic current of the fuel cells in the stack based on the measured voltage drop during the test protocol includes measuring cell voltage and coulombic charge of the fuel cells in the stack as fuel cell voltage drops each time after the cathode air flow is stopped.

11. The method according to claim 8 wherein determining the shorting resistance and the cross-over parasitic current from the total parasitic current includes plotting hydrogen concentration in an anode side of the stack on an x-axis of a graph and plotting the total parasitic current on a y-axis of the graph.

12. The method according to claim 11 wherein plotting the hydrogen concentration in the anode side of the stack on the x-axis and the total parasitic current on the y-axis includes forming a line, wherein a slope of the line represents the cross-over parasitic current and an intercept of the line represents the shorting resistance.

13. The method according to claim 8 further comprising adapting a bleed schedule of the fuel cell stack when a predetermined threshold of cross-over parasitic current has been achieved.

14. The method according to claim 8 further comprising indicating that fuel cell stack repair is necessary if a predetermined threshold of shorting resistance has been achieved.

15. A method for determining the health of membranes in a fuel cell stack, said method comprising:
   determining a total parasitic current of fuel cells in the stack as a function of pressure; and
   determining a shorting resistance and a cross-over parasitic current from the total parasitic current to determine the health of the membranes in the stack.

16. The method according to claim 15 wherein determining the total parasitic current of the fuel cells in the stack includes stepping down the concentration of hydrogen in an anode side of the stack, stopping a cathode air flow on a cathode side of the stack each time the hydrogen concentration is stepped down and measuring cell voltage and coulombic charge of the fuel cells in the stack as fuel cell voltage drops each time after the cathode air flow is stopped.

17. The method according to claim 15 wherein determining the shorting resistance and the cross-over parasitic current from the total parasitic current includes plotting hydrogen concentration in an anode side on an x-axis and total parasitic current on a y-axis of a graph.

18. The method according to claim 17 wherein plotting hydrogen concentration in the anode side on the x-axis and total parasitic current on the y-axis includes forming a line, where a slope of the line represents the cross-over parasitic current and an intercept of the line represents the shorting resistance.

19. The method according to claim 15 further comprising adapting a bleed schedule of the fuel cell stack when a predetermined threshold of the cross-over parasitic current has been achieved.

20. The method according to claim 15 further comprising indicating that repair of the fuel cell stack is necessary if a predetermined threshold of the shorting resistance has been achieved.

* * * * *